US012140294B1

(12) United States Patent
Hou et al.

(10) Patent No.: US 12,140,294 B1
(45) Date of Patent: Nov. 12, 2024

(54) EASILY-ASSEMBLED/DISASSEMBLED LIGHTING FIXTURE

(71) Applicant: JIANGXI SUPERSUN TECHNOLOGY LIGHTING CO., LTD, Jiangxi (CN)

(72) Inventors: Mingxia Hou, Guangdong (CN); Lizhen Wang, Jiangxi (CN)

(73) Assignee: JIANGXI SUPERSUN TECHNOLOGY LIGHTING CO., LTD, Shangrao (CN)

( * ) Notice: Subject to any disclaimer, the term of this patent is extended or adjusted under 35 U.S.C. 154(b) by 0 days.

(21) Appl. No.: 18/518,589

(22) Filed: Nov. 23, 2023

(30) Foreign Application Priority Data

Sep. 11, 2023 (CN) ......................... 202311171510.0

(51) Int. Cl.
*F21V 17/12* (2006.01)
*F21V 17/16* (2006.01)
*F21V 31/00* (2006.01)

(52) U.S. Cl.
CPC ............ *F21V 17/12* (2013.01); *F21V 17/164* (2013.01); *F21V 31/005* (2013.01)

(58) Field of Classification Search
CPC ....... F21V 17/12; F21V 17/164; F21V 31/005
See application file for complete search history.

(56) References Cited

U.S. PATENT DOCUMENTS 9,476,581 B2 * 10/2016 Wu ......................... F21V 29/67
2014/0347848 A1 * 11/2014 Pisavadia .................. F21S 8/04 362/190
2022/0357024 A1 * 11/2022 Lambert ............... F21V 21/116

* cited by examiner

*Primary Examiner* — John W Poos
*Assistant Examiner* — Jessica M Apenteng
(74) *Attorney, Agent, or Firm* — Zhigang Ma

(57) ABSTRACT

The present disclosure discloses an easily-assembled/disassembled lighting fixture. A power supply module includes a power supply body, a lifting ring, and a first connecting assembly. A female power connector in the power supply body protrudes out of a bottom of the power supply body, the lifting ring is connected to a top of the power supply body in a threaded manner, and the first connecting assembly is fastened to the bottom of the power supply body by using a screw. The power supply module is buckled to a first buckle assembly at a top of a lamp body by using the first connecting assembly, and the female power connector is inserted into a male power connector inside the lamp body. An optical lens is buckled to a second buckle assembly at a bottom of the lamp body by using a first buckling slot.

9 Claims, 17 Drawing Sheets

EASILY-ASSEMBLED/DISASSEMBLED LIGHTING FIXTURE

CROSS REFERENCE TO RELATED APPLICATIONS

The present application claims the benefit of Chinese Patent Application No. 202311171510.0 filed on Sep. 11, 2023, the contents of which are incorporated herein by reference in their entirety.

TECHNICAL FIELD

The present disclosure relates to the field of lighting technologies, and in particular, to an easily-assembled/disassembled lighting fixture.

BACKGROUND

Most of existing lamp manufacturing technologies are fully fixed or completely independent multi-module products. Because components of a fully fixed lamp are completely fixed before delivery, if a client terminal involves replacement of a component of the product, multi-step disassembly needs to be performed on the lamp. A tool needs to be used for a component that is fixed using a screw, and consequently, the disassembly is not easy and is relatively time-consuming. If the product is fixed using connection methods such as glue bonding, ultrasonic welding, and high pressure cylinder buckling, destructive disassembly needs to be performed on the product. However, the destructive disassembly directly affects reliability and safety of the product, or even directly causes the product to be scrapped.

The fully-modular product provides convenience to some extent, but easily causes a waste of materials because a module is used as a whole. When a module is to be replaced, a component that does not need to be replaced has to be replaced together with the module, causing a large quantity of available resources to fail ahead of time within a validity period of utilization, which is quite not conducive to green development of material resources.

SUMMARY

To resolve a problem in a conventional technology, the present disclosure provides an easily-assembled/disassembled lighting fixture.

To achieve the foregoing objective, the present disclosure provides the following technical solutions:

An easily-assembled/disassembled lighting fixture includes:

a power supply module, wherein the power supply module comprises a power supply body, a lifting ring, and a first connecting assembly, a female power connector is disposed in the power supply body, the female power connector protrudes out of a bottom of the power supply body, a bump is disposed on a top of the power supply body, the lifting ring is fixedly connected to a center of the bump in a threaded manner, and the first connecting assembly is fastened to the bottom of the power supply body by using a screw;

a lamp body, wherein a male power connector is disposed in the lamp body, a plurality of first buckle assemblies are disposed on a top of the lamp body, a plurality of second buckle assemblies are disposed on a bottom of the lamp body, the power supply module is buckled to the first buckle assembly by using the first connecting assembly and is integrally connected to the top of the lamp body, and the female power connector is inserted into the male power connector; and an optical lens, wherein a plurality of first buckling slots corresponding to the second buckle assemblies are disposed on the optical lens, and the optical lens is buckled to the second buckle assembly by using the first buckling slot and is integrally connected to the bottom of the lamp body.

Optionally, the plurality of first connecting assemblies each comprise a first connecting member and a second connecting member, and a second buckling slot is disposed at each of two ends of the first connecting member and at each of two ends of the second connecting member.

Optionally, a quantity of the plurality of first buckle assemblies is set to be at least two, each of the first buckle assemblies comprises a buckle and an adjustment handle, the adjustment handle is disposed at one end of the buckle, and the adjustment handle is configured to adjust the buckle to be buckled to the second buckling slot;

the optical lens can alternatively be fastened to the lamp body by using a screw, a via hole is further disposed on the adjustment handle, and the adjustment handle is fixedly connected to the lamp body by using a screw through the via hole.

Optionally, the lamp body further comprises a spindle screw or bolt, an isolation pad, and an isolation pillar corresponding to each buckle, a via hole is disposed on each buckle, the isolation pillar is sleeved inside the via hole, and the spindle screw or bolt is fastened to the lamp body via the isolation pad and the isolation pillar.

Optionally, a fastening handle is further disposed on the optical lens, the fastening handle is configured to adjust the first buckling slot to be buckled and connected to the second buckle assembly, and a perspective window corresponding to the buckling slot is disposed in the optical lens.

Optionally, a quantity of the plurality of second buckle assemblies is set to be at least two, each of the second buckle assemblies comprises a fastening block, a buckling block, and a pressing handle, the fastening block is fastened to the bottom of the lamp body, the buckling block is disposed at one end of the fastening block, the pressing handle is disposed at one end of the buckling block, a limiting block is further disposed on each buckling block, and a deformation guide slot is disposed between the pressing handle and the fastening block.

Optionally, the power supply module further comprises an anti-falling member, and the anti-falling member runs through one side of the bump and abuts against the lifting ring.

Optionally, the female power connector comprises a positioning pin and a foolproof bump, a positioning hole corresponding to the positioning pin is disposed in the male power connector, a foolproof hole corresponding to the foolproof bump is disposed in the male power connector, an extended interface is further disposed in the male power connector, and a waterproof plug is disposed at the extended interface.

Optionally, the power supply module can alternatively be fastened to the lamp body by using a screw, the extended interface runs through the optical lens, and the waterproof plug is disposed on the optical lens and is connected to the extended interface in a threaded manner.

Optionally, an optical lens can alternatively be fastened to a lamp body by using a screw, a via hole is further disposed on an adjustment handle, and the adjustment handle can be fixedly connected to the lamp body by using a screw through the via hole.

Optionally, a heat sink structure is further disposed on a periphery of the lamp body.

Using the technical solutions in the present disclosure brings the following beneficial effects:

(1) In the present disclosure, a first connecting assembly is fastened to a bottom of a power supply body by using a screw, and the first connecting assembly is buckled to a first buckle assembly of a lamp body, so that a power supply module can be buckled and connected to the lamp body. In addition, a female power connector is inserted into a male power connector, thereby implementing direct connection of a power supply without using a cable to connect the power supply and a circuit of the lamp body through welding. In this way, the power supply can be assembled or disassembled modularly, thereby facilitating subsequent maintenance and replacement. Moreover, the first buckle assembly includes a buckle and an adjustment handle. The adjustment handle can be used to adjust the buckle to a snap-in position state and tension for clamping with a second buckling slot in the first connecting assembly. After the buckle is firmly clamped, the adjustment handle can be selectively fastened by using a screw. In this way, the first connecting assembly can be completely fixed, so that the power supply module is connected to the lamp body more firmly, and a possibility of bare-handed disassembly is eliminated.

(2) In the present disclosure, a first buckling slot on an optical lens is buckled to a second buckle assembly of the lamp body, thereby implementing modular assembly and maintenance of the optical lens and the lamp body. During assembly, a fastening handle can be used to adjust corresponding positions of the first buckling slot and the second buckle assembly, and a perspective window can be used to observe, at any time, whether the first buckling slot and the second buckle assembly are buckled in place, so that the snap-in steps are effectively visualized and mounting is more convenient.

(3) In the present disclosure, the power supply module further includes an anti-falling member, and the anti-falling member runs through one side of a bump and abuts against a lifting ring. Such a design ensures that a lighting fixture is not likely to fall when being hung on a wall by using the lifting ring.

DESCRIPTION OF EMBODIMENTS

Figure 1:
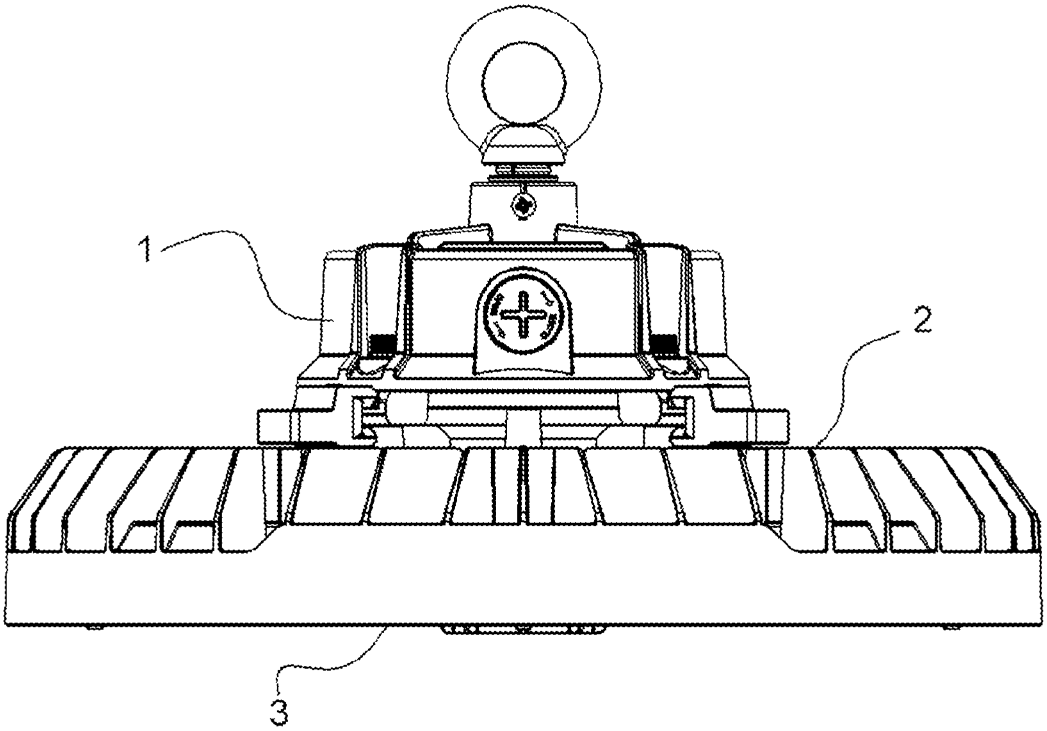
FIG. 1 is a schematic diagram of an overall structure according to the present disclosure.
Figure 2:
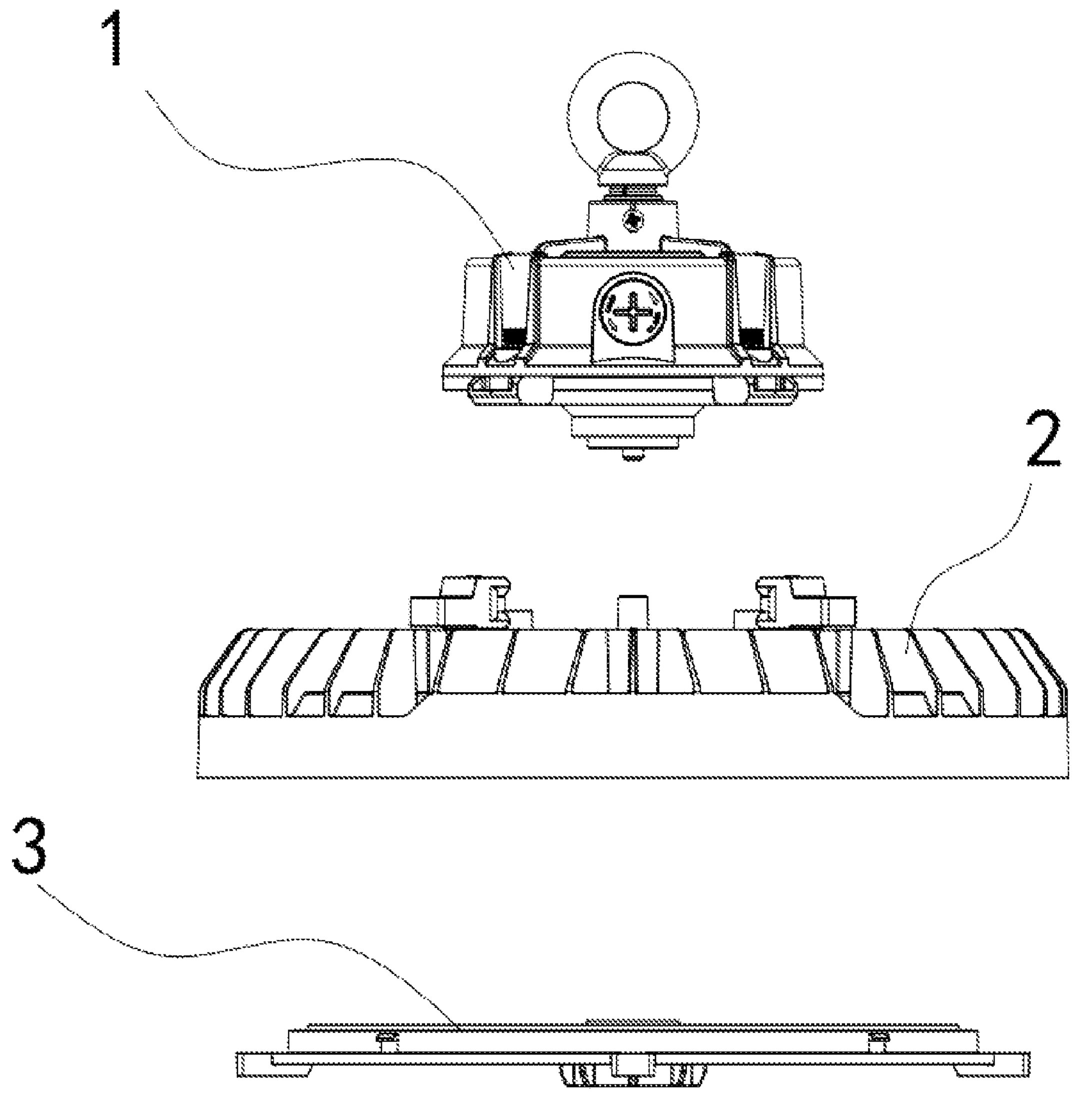
FIG. 2 is a schematic diagram of an overall exploded structure according to the present disclosure.

The following describes in detail some embodiments of the present disclosure, and examples of the embodiments are shown in the accompanying drawings, where identical or similar reference numerals represent identical or similar elements or elements having identical or similar functions. Some embodiments described below with reference to the accompanying drawings are examples and are intended to explain the present disclosure, and should not be understood as a limitation on the present disclosure.

In the description of the present disclosure, it should be understood that orientation or position relationships indicated by terms such as “center”, “longitudinal”, “transverse”, “length”, “width”, “thickness”, “up”, “down”, “front”, “rear”, “left”, “right”, “vertical”, “horizontal”, “top”, “bottom”, “inside”, “outside”, “clockwise”, and “counterclockwise” are based on orientation or position relationships shown in the accompanying drawings and are merely for ease of description of the present disclosure and simplification of the description, rather than indicating or implying that the apparatuses or elements referred to must have a specific orientation or be constructed and operated in a specific orientation, and therefore should not be understood as a limitation on the present disclosure.

In addition, terms “first” and “second” are used merely for description purposes, and should not be understood as an indication or an implication of relative importance or an implicit indication of a quantity of indicated technical features. Therefore, features defined by “first” and “second” may explicitly or implicitly include one or more of the features. In the descriptions of the present invention, “a plurality of” means two or more, unless otherwise specifically defined.

In the present disclosure, unless otherwise specified and defined explicitly, the terms “mount”, “connected to”, “connect”, and “fasten” should be understood in a broad sense, for example, may be a fixed connection, may be a detachable connection or an integrated connection: may be a mechanical connection, or may be an electrical connection; and may be a direct connection, may be an indirect connection through an intermediate medium, or may be internal communication between two elements. A person of ordinary skill in the art can understand specific meanings of the foregoing terms in this disclosure based on an actual situation.

In the present disclosure, unless otherwise specified and defined explicitly, that a first feature is "above" or "below" a second feature may include that the first feature is in direct contact with the second feature, or may include that the first feature is not in direct contact with the second feature, and instead the first feature is in contact with the second feature through another feature between the first feature and the second feature. In addition, that the first feature is "above", "over", or "on top of" the second feature includes that the first feature is directly above or obliquely above the second feature, or only indicates that a horizontal height of the first feature is greater than that of the second feature. That the first feature is "below", "under", or "underneath" the second feature includes that the first feature is directly under or obliquely under the second feature, or only indicates that a horizontal height of the first feature is less than that of the second feature.

Referring to FIG. 1 to FIG. 6, the present disclosure provides an easily-assembled/disassembled lighting fixture, including:

- a power supply module 1, where the power supply module 1 includes a power supply body 16, a lifting ring 15, and a first connecting assembly 14, a female power connector 12 is disposed in the power supply body 16, the female power connector 12 protrudes out of a bottom of the power supply body 16, a bump 11 is disposed on a top of the power supply body 16, the lifting ring 15 is fixedly connected to a center of the bump 11 in a threaded manner, and the first connecting assembly 14 is fastened to the bottom of the power supply body 16 by using a screw;
- a lamp body 2, where a male power connector 24 is disposed in the lamp body 2, a plurality of first buckle assemblies 27 are disposed on a top of the lamp body 2, a plurality of second buckle assemblies 26 are disposed on a bottom of the lamp body 2, the power supply module 1 is buckled to the first buckle assembly 27 by using the first connecting assembly 14 and is integrally connected to the top of the lamp body 2, and the female power connector 12 is inserted into the male power connector 24; and
- an optical lens 3, where a plurality of first buckling slots 31 corresponding to the second buckle assemblies 26 are disposed on the optical lens 3, and the optical lens 3 is buckled to the second buckle assembly 26 by using the first buckling slot 31 and is integrally connected to the bottom of the lamp body 2.

Specifically, the first connecting assembly 14 is fastened to the bottom of the power supply body 16 by using a screw, and the first connecting assembly 14 is buckled to the first buckle assembly 27 of the lamp body 2, so that the power supply module 1 can be buckled and connected to the lamp body 2. In addition, the female power connector 12 is inserted into the male power connector 24, thereby implementing direct connection of the power supply without using a cable to connect the power supply 1 and a circuit of the lamp body 2 through welding. In this way, the power supply can be assembled or disassembled modularly, thereby facilitating subsequent maintenance and replacement. Moreover, the first buckling slot 31 on the optical lens 3 is buckled to the second buckle assembly 26 of the lamp body 2, thereby implementing modular assembly and maintenance of the optical lens 3 and the lamp body 2. In addition, a heat sink structure 21 is further disposed on a periphery of the lamp body 2, and the heat sink structure 21 is configured to dissipate heat for the lamp body 2.

Referring to FIG. 3, FIG. 4, FIG. 15, FIG. 16, and FIG. 17, in these embodiments, the first connecting assembly 14 includes a first connecting member 141 and a second connecting member 142; a second buckling slot 1411 is disposed at each of two ends of the first connecting member 141 and at each of two ends of the second connecting member 142: a quantity of the plurality of first buckle assemblies 27 is set to be at least two, each of the first buckle assemblies 27 includes a buckle 272 and an adjustment handle 273: the adjustment handle 273 is disposed at one end of the buckle 272, and the adjustment handle 273 is configured to adjust the buckle 272 to be buckled to the second buckling slot 1411.

Specifically, the adjustment handle 273 can be used to adjust the buckle 272 to a snap-in position state and tension for clamping with the second buckling slot 1411. After the buckle 272 is firmly clamped, the adjustment handle 273 can be selectively fastened by using a screw. In this way, the first connecting assembly 14 can be completely fixed, so that the power supply module 1 is connected to the lamp body 2 more firmly, and a possibility of bare-handed disassembly is eliminated. The lens 3 can alternatively be fastened to the lamp body 2 by using a screw, a via hole is further disposed on the adjustment handle 273, and the adjustment handle 273 is fixedly connected to the lamp body 2 by using a screw through the via hole.

Figure 4:
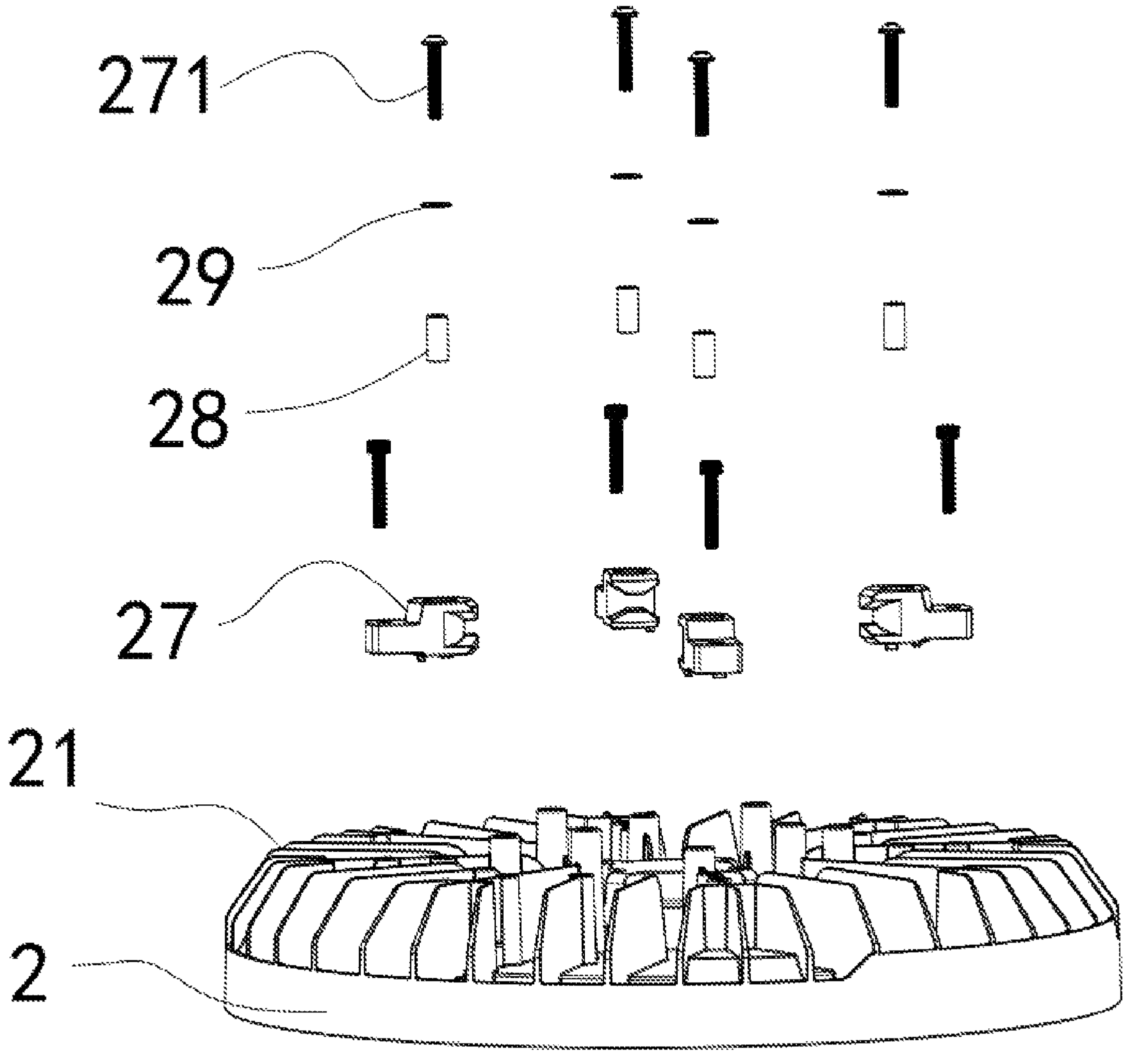
FIG. 4 is a schematic diagram of an exploded structure of a top of a lamp body according to the present disclosure.
Figure 15:
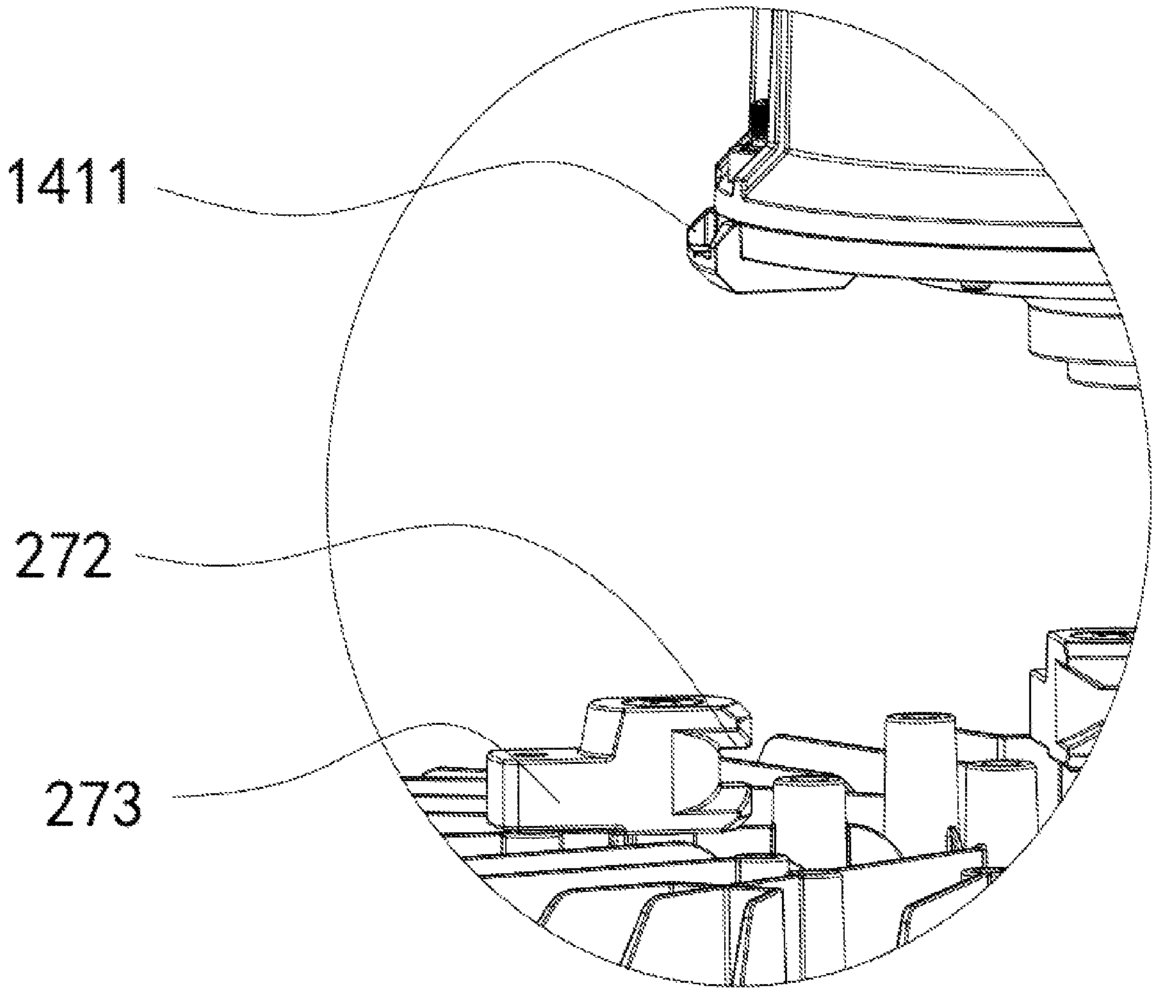
FIG. 15 is a schematic diagram of a partial structure of a connection between a power supply module and a lamp body according to the present disclosure.
Figure 16:
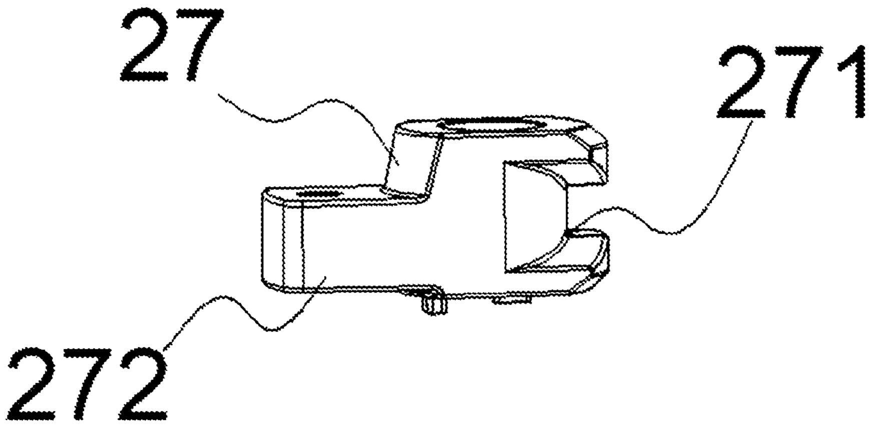
FIG. 16 is a schematic structural diagram of a first buckle assembly according to the present disclosure.
Figure 17:
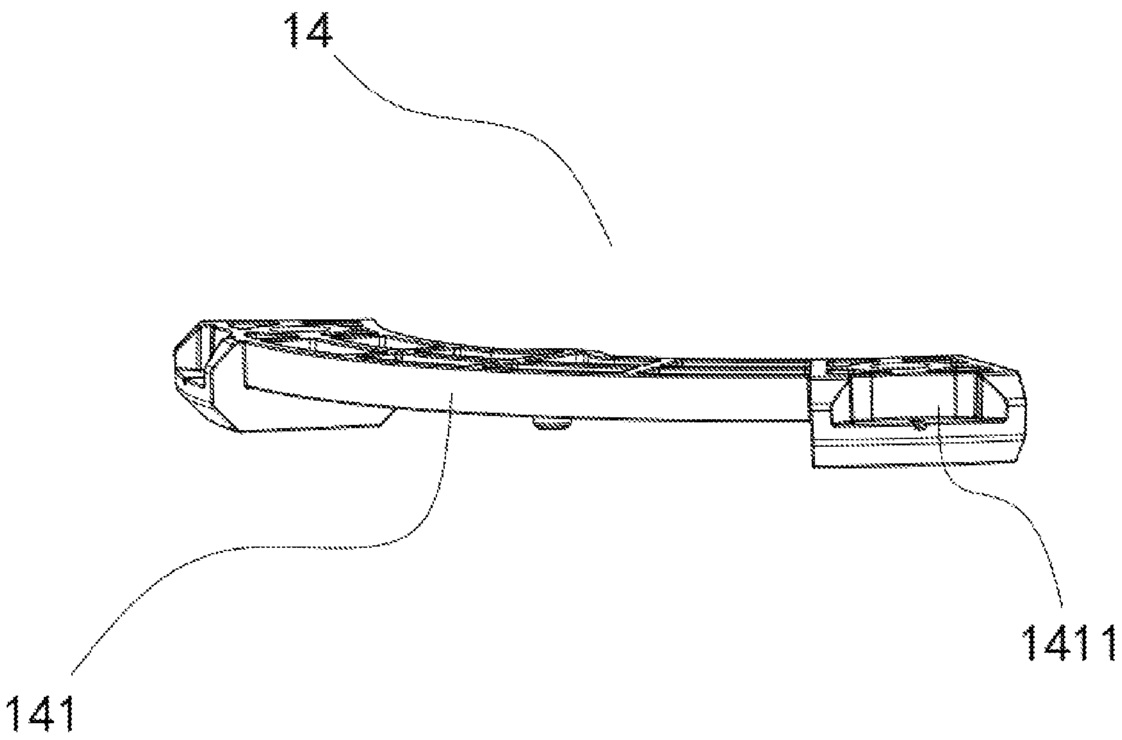
FIG. 17 is a schematic structural diagram of a first connecting member according to the present disclosure.

Referring to FIG. 4 and FIG. 15, in these embodiments, the lamp body 2 further includes a spindle screw 271 or bolt, an isolation pad 29, and an isolation pillar 28 corresponding to each buckle 272, a via hole is disposed on each of the plurality of first buckle assemblies 27, the isolation pillar 28 is sleeved inside the via hole, and the spindle screw 271 or bolt is fastened to the lamp body 2 via the isolation pad 29 and the isolation pillar 28.

Specifically, the spindle screw 271 passes through the via hole in the center of the isolation pad 29, and then passes through the isolation pillar 28 and the first buckle assembly 27, and is connected and fastened to a top surface of the lamp body 2. Such arrangement is intended to restrict vertical movement of the first buckle assembly 27, and bear vertical gravity from the buckle, thereby achieving a purpose of bearing the lamp body 2. In addition, fastening of the isolation pillar 28 and the isolation pad 29 to the spindle screw 271 can only restrict the vertical movement of the buckle. However, the adjustment handle 273 can be used to maintain a characteristic that the buckle 272 can be horizontally rotated. After the buckle 272 is firmly clamped with the second buckling slot 1411, the adjustment handle 273 can be further fastened by using a screw, thereby eliminating a need of disassembling the power supply module 1 by hand. A fastening manner of the screw may be a common screw standard component, may be a thumb screw, or may be a limiting form of a pin.

Referring to FIG. 5, FIG. 6, FIG. 7, FIG. 9, FIG. 10 and FIG. 11, in these embodiments, a fastening handle 32 is further disposed on the optical lens 3, the fastening handle 32 can be configured to adjust a snap-in position of the first buckling slot 31, a via hole is further disposed on the fastening handle 32, the via hole can fasten the optical lens 3 to the lamp body 2 directly by using a screw, and a perspective window 33 is further disposed at a position of the first buckling slot 31 corresponding to the optical lens 3.

Specifically, during assembly of the fastening handle 32 on the optical lens 3, the fastening handle 32 can be used to adjust corresponding positions of the first buckling slot 31 and the second buckle assembly 26, and the perspective window 33 can be used to observe, at any time, whether the first buckling slot 31 and the second buckle assembly 26 are buckled in place, so that the snap-in steps are effectively visualized and mounting is more convenient.

Referring to FIG. 6, FIG. 7, FIG. 8 and FIG. 12, in these embodiments, a quantity of the plurality of second buckle assemblies 26 is set to be at least two, each of the second buckle assemblies 26 includes a fastening block 264, a buckling block 261, and a pressing handle 262, the fastening block 264 is fastened to the bottom of the lamp body 2, the buckling block 261 is disposed at one end of the fastening block 264, the pressing handle 262 is disposed at one end of the buckling block 261, a limiting block 2611 is further disposed on each buckling block 261, and a deformation guide slot 263 is disposed between the pressing handle 262 and the fastening block 264.

Specifically, when the pressing handle 262 is actively pressed, the buckling block 261 is bent outwardly to the deformation slot 263, thereby further reducing a pressing force for mounting the optical lens. After the first buckling slot 31 is completely embedded into the buckling block 261 by pressing a periphery of the perspective window 33, oblique shear stress disappears so that the buckling block 261 is self-recovered from the deformation and tightly fastened to the first buckling slot 31, and emits a self-recovery elastic sound to provide sound feedback prompting that the press mounting is in place. In this way, the optical lens 3 is tightly mounted to the lamp body, and the buckling block 261 restricts vertical movement of the optical lens 3. In addition, the limiting block 2611 further wraps two ends of the first buckling slot 31, so as to restrict horizontal movement of the optical lens 3.

Pressing the pressing handle 262 again can cause the optical lens 3 module to exhibit an unbuckling behavior, that is, unfasten a buckle structure of the optical lens 3, thereby achieving a purpose of convenient disassembly.

Figure 3:
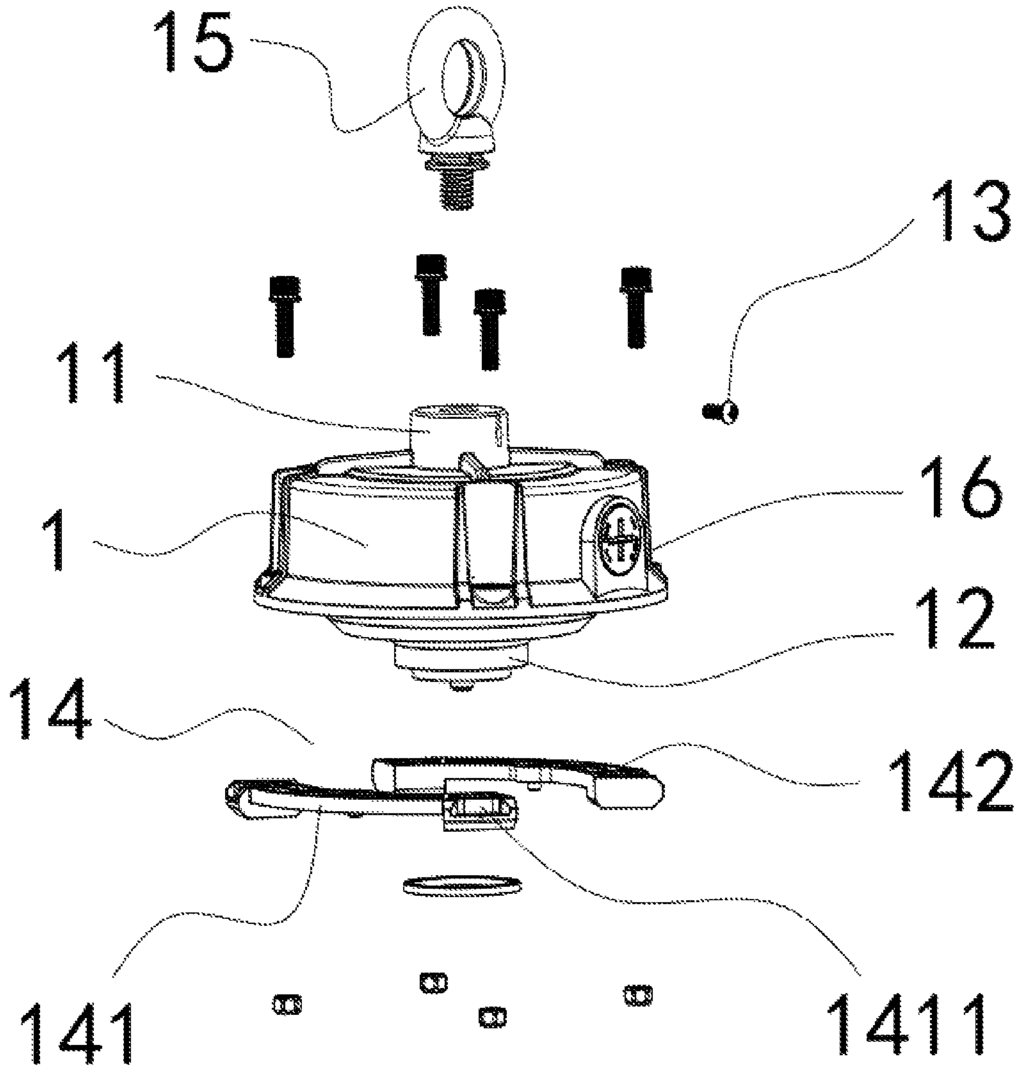
FIG. 3 is a schematic diagram of an exploded structure of a power supply module according to the present disclosure.

Referring to FIG. 3, in these embodiments, the power supply module 1 further includes an anti-falling member 13, and the anti-falling member 13 runs through one side of the bump 11 and abuts against the lifting ring 15.

Specifically, the lifting ring 15 is tightened on the bump 11 of the power supply module 1 in a form of threaded rotation, and is configured to provide a mounting and hanging position for the lamp. The mounting form of the lifting ring 15 may alternatively be a form such as a hook, a threaded tube, or a surface mounting bracket. When the lighting fixture is hung on a wall by using the lifting ring 15, the lifting ring 15 is tightened on the bump 11 by using the anti-falling member 13 (namely, an anti-falling screw), so as to prevent loosening of the mounted lifting ring 15, and prevent unintentional detachment of the lifting ring 15 from the power supply module 1.

Figure 5:
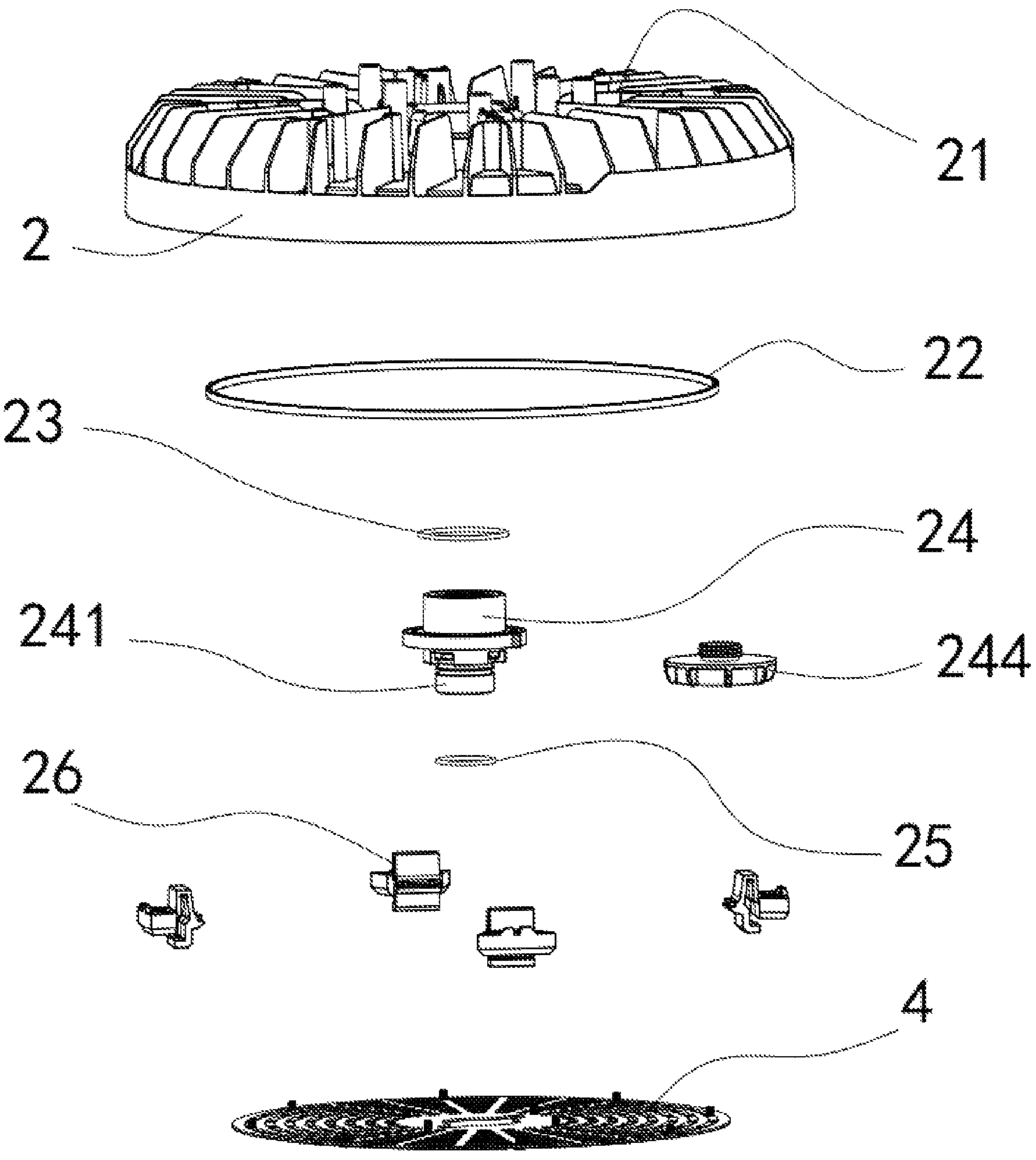
FIG. 5 is a schematic diagram of an exploded structure of a bottom of a lamp body according to the present disclosure.
Figure 6:
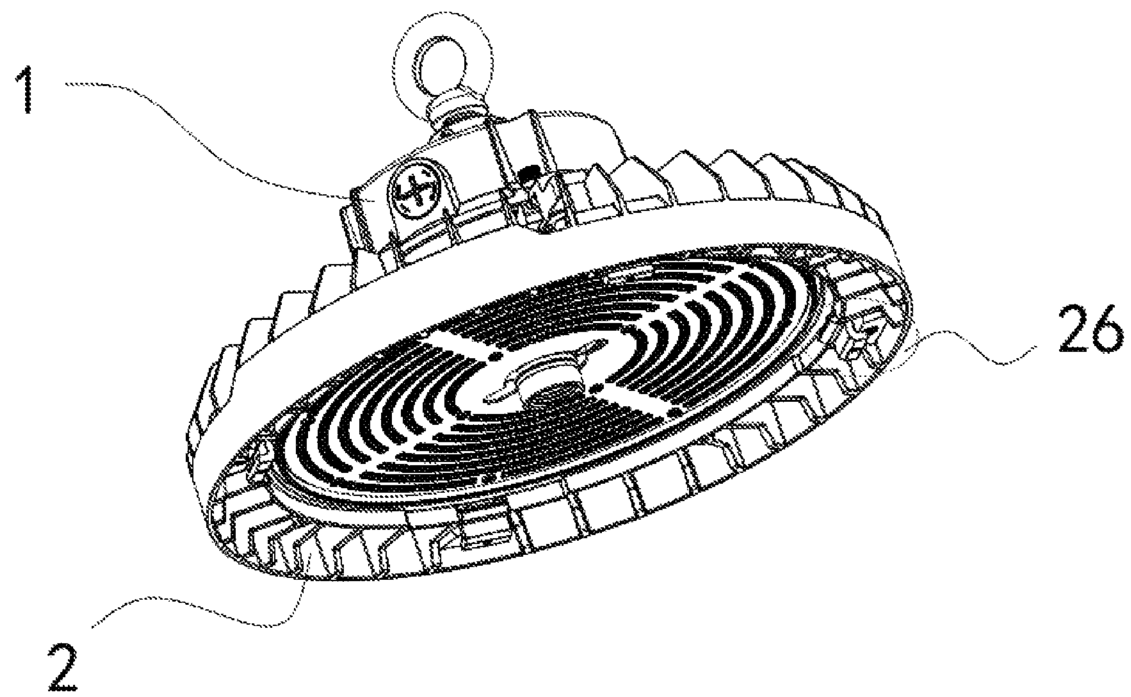
FIG. 6 is a schematic structural diagram of a connection between a power supply module and a lamp body according to the present disclosure.
Figure 7:
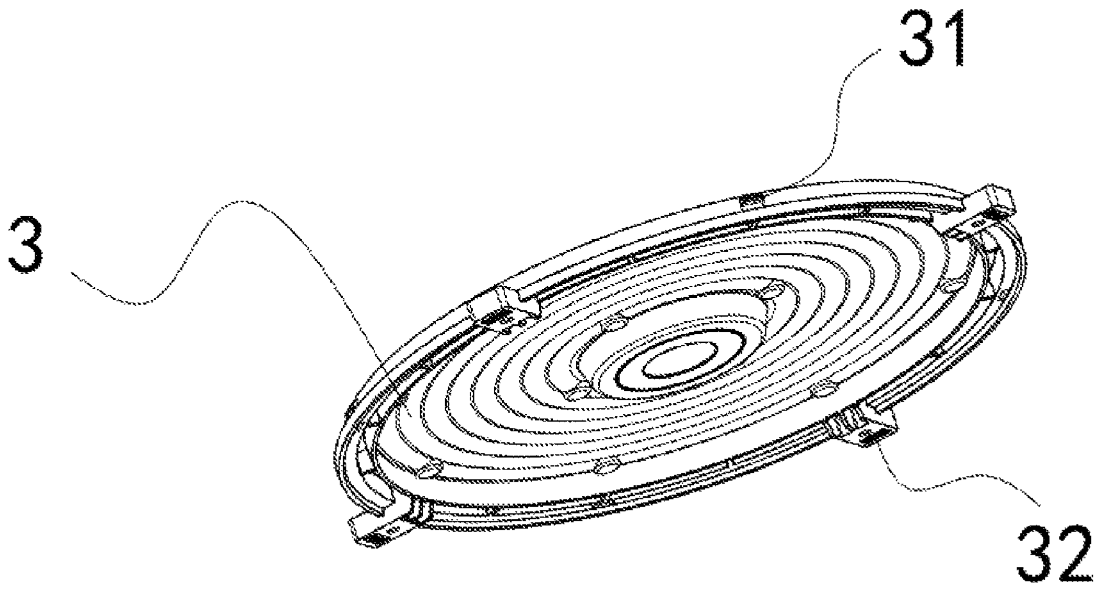
FIG. 7 is a schematic structural diagram of an optical lens according to the present disclosure.
Figure 8:
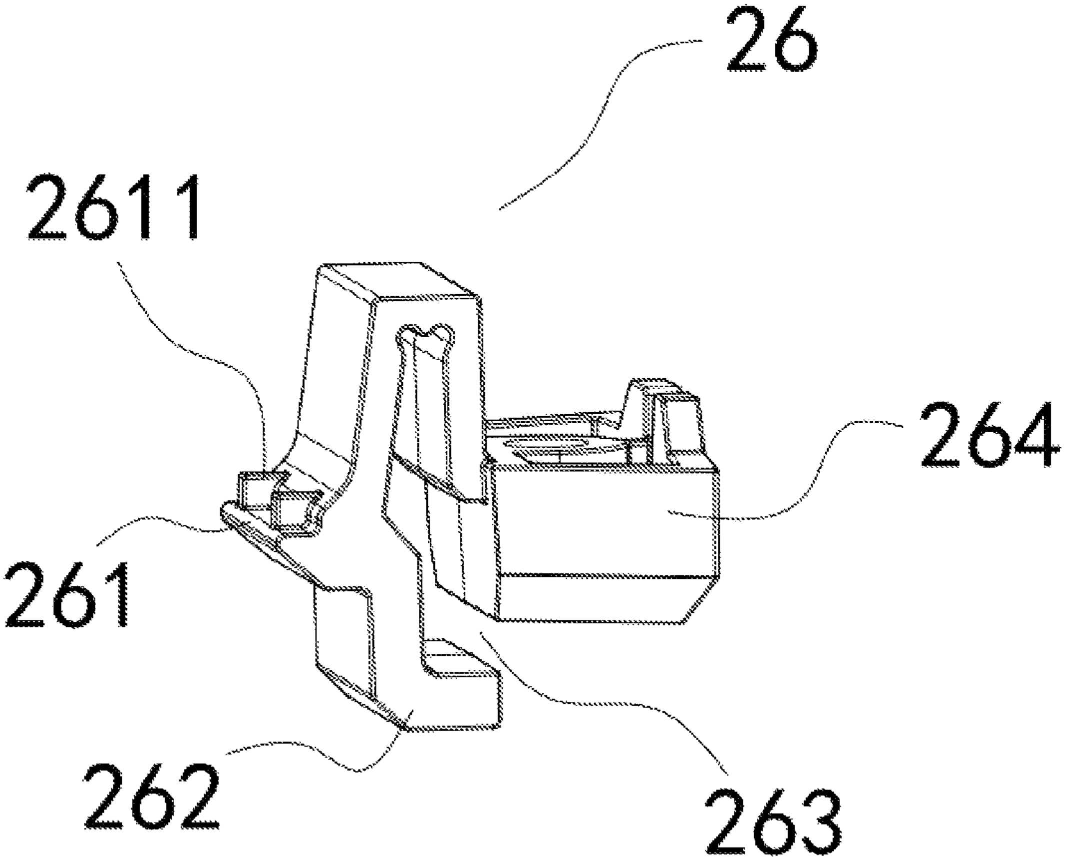
FIG. 8 is a schematic structural diagram of a second buckle assembly according to the present disclosure.
Figure 9:
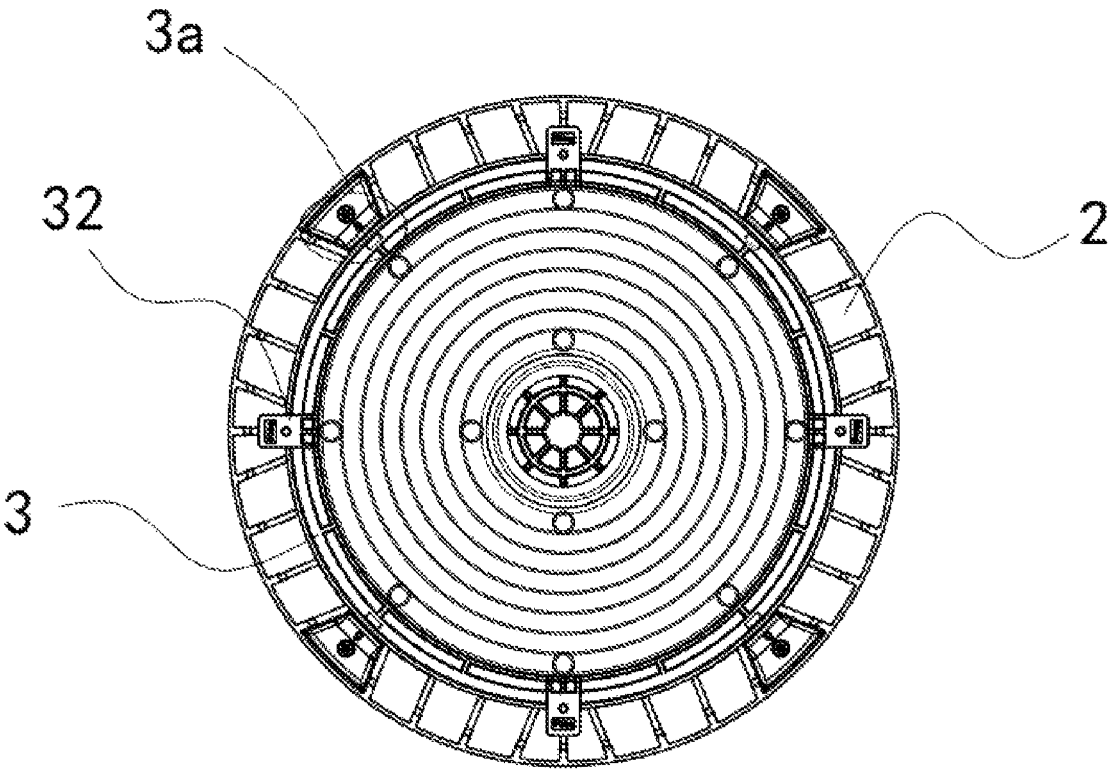
FIG. 9 is a schematic structural diagram of a connection between an optical lens and a lamp body according to the present disclosure.
Figure 10:
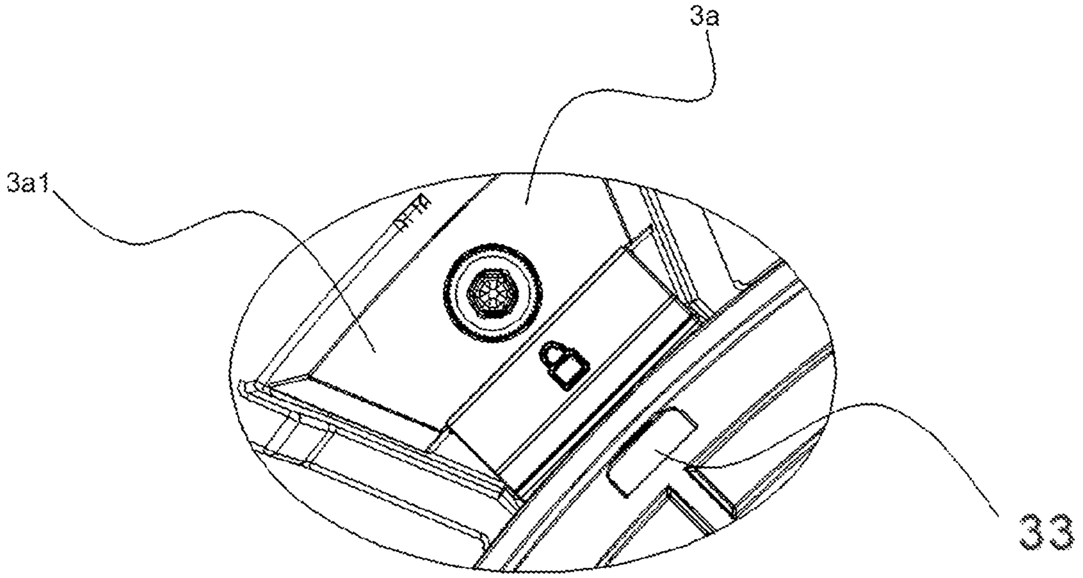
FIG. 10 is a schematic diagram of an enlarged structure of 3*a* in FIG. 9 according to the present disclosure.
Figure 11:
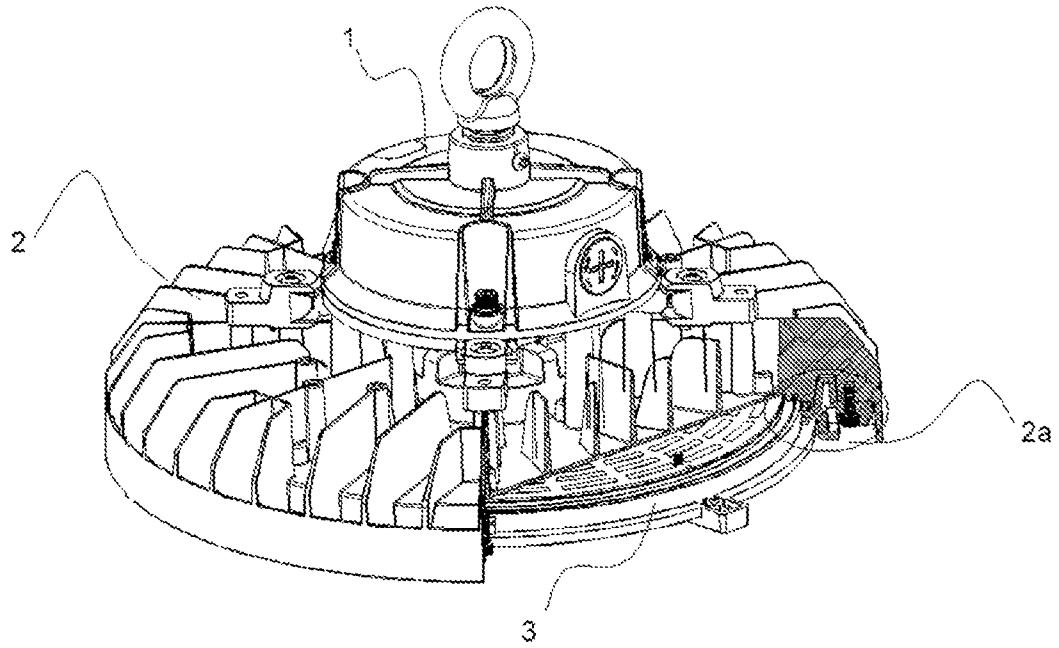
FIG. 11 is a schematic diagram of a cross-sectional structure of a connection between a lamp body and each of a power supply module and an optical lens according to the present disclosure.
Figure 12:
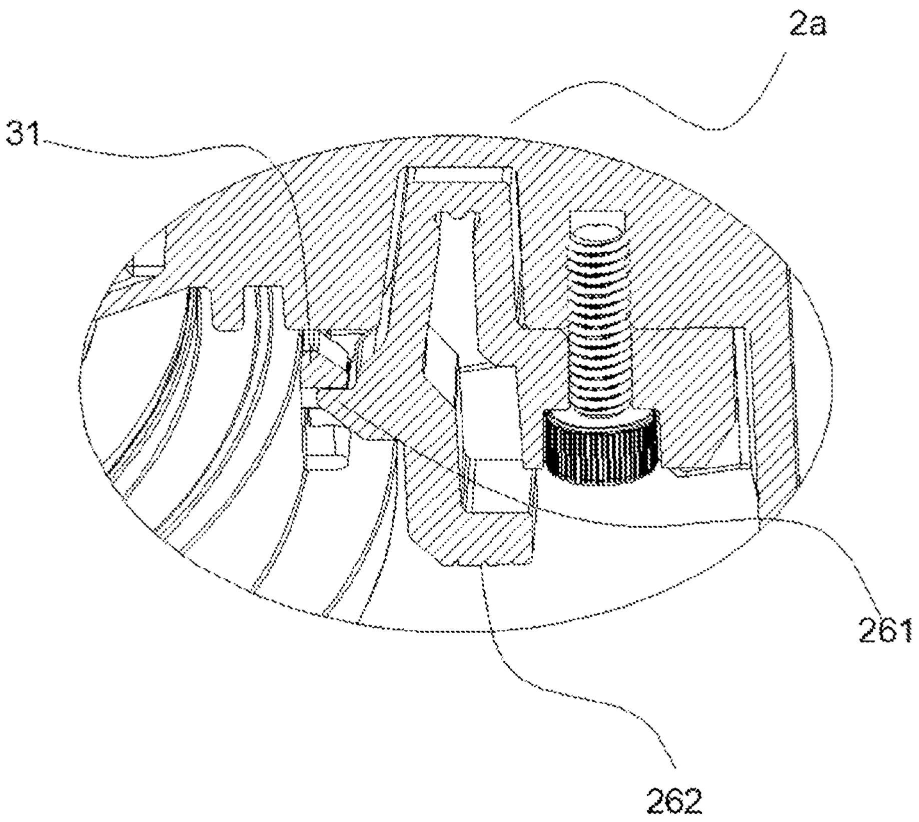
FIG. 12 is a schematic diagram of an enlarged structure of 2*a* in FIG. 11 according to the present disclosure.
Figure 13:
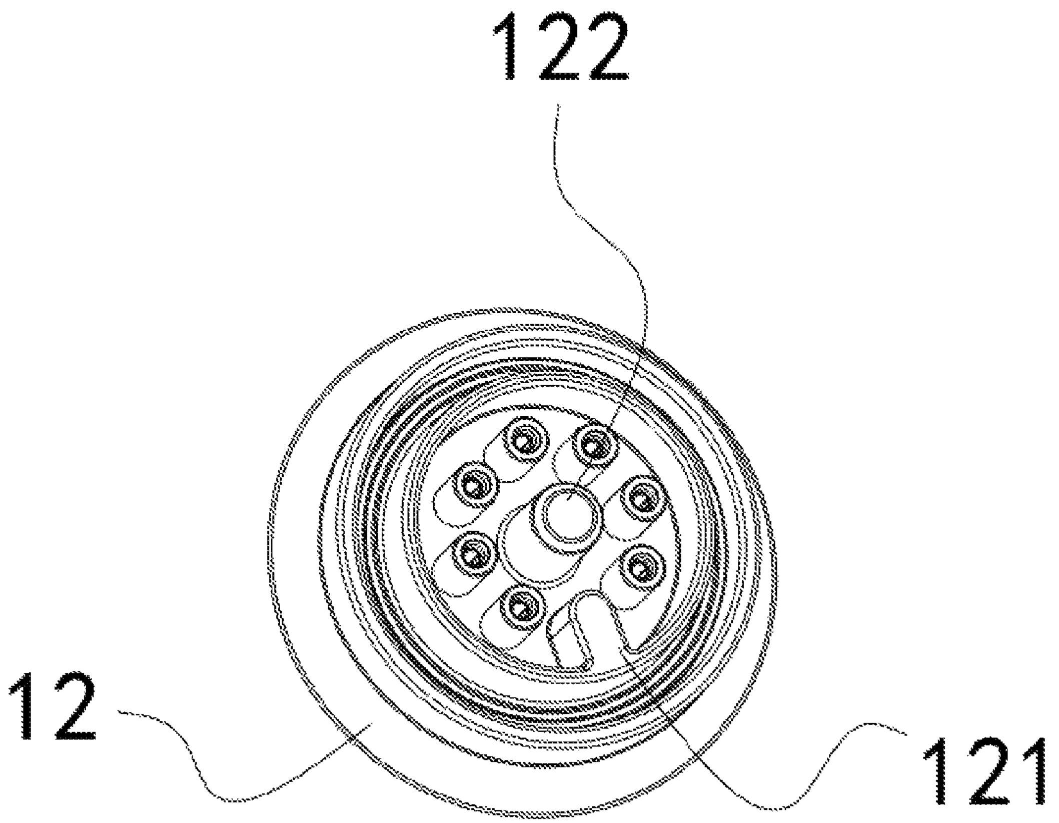
FIG. 13 is a schematic structural diagram of a female power connector according to the present disclosure.
Figure 14:
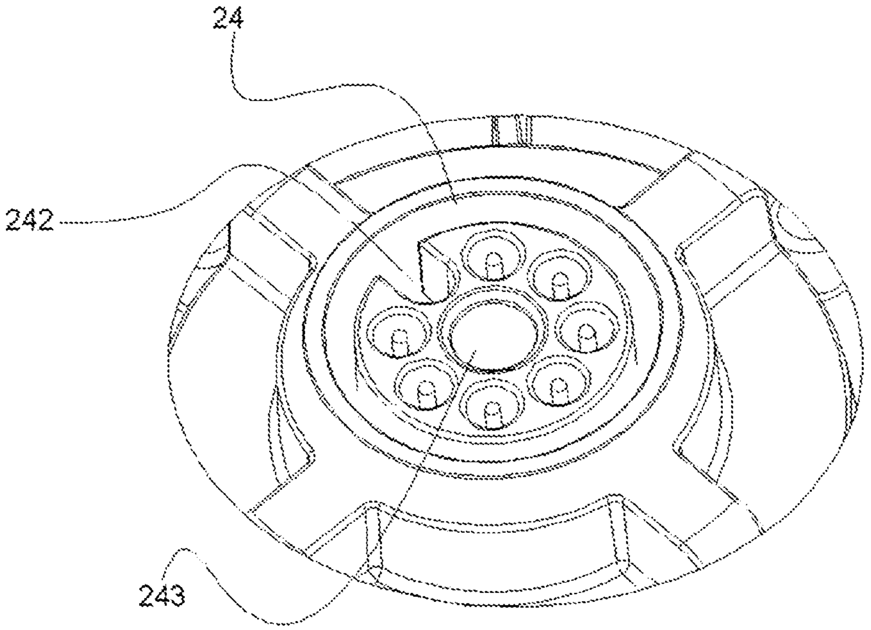
FIG. 14 is a schematic structural diagram of a male power connector according to the present disclosure.

Referring to FIG. 5, FIG. 13, and FIG. 14, in these embodiments, the female power connector 12 includes a positioning pin 122 and a foolproof bump 121, a positioning hole 243 corresponding to the positioning pin 122 is disposed in the male power connector 24, a foolproof hole 242 corresponding to the foolproof bump 121 is disposed in the male power connector 24, an extended interface 241 is further disposed in the male power connector 24, and a waterproof plug 244 is disposed at the extended interface 241.

Specifically, a connection between the female power connector 12 and the male power connector 24 is an electrical connection between the power supply module 1 and the lamp body 2, such as transmission and conduction of a primary power supply and an auxiliary power supply, signal transmission, and ground connection. In addition, the extended interface 241 is configured to connect to an external expansion module, for example, an external incremental device such as a miniature sensor, an infrared sensor, and a Bluetooth controller.

Referring to FIG. 1 and FIG. 5, in these embodiments, the power supply module 1 can alternatively be fastened to the lamp body 2 by using a screw, the extended interface 241 runs through the optical lens 3, and the waterproof plug 244 is disposed on the optical lens 3 and is connected to the extended interface 241 in a threaded manner.

After the optical lens 3 is mounted to the lamp body 2, the waterproof plug 244 is screwed into the extended interface 241, so that an effective binding force with the lamp body 2 is generated in the center of the optical lens 3. In addition, a problem of detachment of the optical lens 3 caused by unintentional pressing of the pressing handle 262 is avoided, effectively enhancing an anti-loosening capability of the optical lens 3. After the mounting of the optical lens 3 is completed, the optical lens 3 may alternatively be completely fastened to the lamp body 2 selectively by using a fastening screw, so as to eliminate a need of disassembling the optical lens 3 by hand. A fastening manner of the screw may be a common screw standard component, may be a thumb screw, or may be a limiting form of a pin.

Referring to FIG. 3 and FIG. 5, in these embodiments, a first waterproof ring 22 corresponding to the optical lens 3 is disposed in the lamp body 2, a second waterproof ring 23 corresponding to the top of the male power connector 24 is sleeved in the lamp body 2, a third waterproof ring 25 is sleeved on the extended interface 241, a lamp board 4 is further disposed in the lamp body 1, and the lamp board 4 is electrically connected to the female power connector 12 via the male power connector 24.

Specifically, the first waterproof ring 22 is configured to perform edge waterproofing on the optical lens 3 and the lamp body 2, the second waterproof ring 23 is configured to perform waterproofing on the male power connector 24 and the back of the center of the lamp body, and the third waterproof ring 25 is configured to: when the waterproof plug 244 is screwed into the extended interface 241, perform waterproofing by press-fitting the third waterproof ring 25 into a center hole of the lens 2.

The foregoing descriptions are merely some example embodiments of the present disclosure, and are not intended to limit the protection scope of the present disclosure. All equivalent structural transformations made according to the content of the specification and accompanying drawings of the present disclosure without departing from the concept of the present disclosure, or direct/indirect application of the content of the specification and accompanying drawings of the present disclosure to other related technical fields shall fall within the protection scope of the present disclosure.

What is claimed is:

1. An easily-assembled/disassembled lighting fixture, comprising:

a power supply module, wherein the power supply module comprises a power supply body, a lifting ring, and a first connecting assembly, a female power connector is disposed in the power supply body, the female power connector protrudes out of a bottom of the power supply body, a bump is disposed on a top of the power supply body, the lifting ring is fixedly connected to a center of the bump in a threaded manner, and the first connecting assembly is fastened to the bottom of the power supply body by using a screw;

a lamp body, wherein a male power connector is disposed in the lamp body, a plurality of first buckle assemblies are disposed on a top of the lamp body, a plurality of second buckle assemblies are disposed on a bottom of the lamp body, the power supply module is buckled to the first buckle assembly by using the first connecting assembly and is integrally connected to the top of the lamp body, and the female power connector is inserted into the male power connector; and an optical lens, wherein a plurality of first buckling slots corresponding to the second buckle assemblies are disposed on the optical lens, and the optical lens is buckled to the second buckle assembly by using the first buckling slot and is integrally connected to the bottom of the lamp body;

wherein the plurality of first connecting assemblies each comprise a first connecting member and a second connecting member, and a second buckling slot is disposed at each of two ends of the first connecting member and at each of two ends of the second connecting member.

2. The easily-assembled/disassembled lighting fixture according to claim 1, wherein a quantity of the plurality of first buckle assemblies is set to be at least two, each of the first buckle assemblies comprises a buckle and an adjustment handle, the adjustment handle is disposed at one end of the buckle, and the adjustment handle is configured to adjust the buckle to be buckled to the second buckling slot;

the optical lens can alternatively be fastened to the lamp body by using a screw, a via hole is further disposed on the adjustment handle, and the adjustment handle is fixedly connected to the lamp body by using a screw through the via hole.

3. The easily-assembled/disassembled lighting fixture according to claim 2, wherein the lamp body further comprises a spindle screw or bolt, an isolation pad, and an isolation pillar corresponding to each buckle, a via hole is disposed on each buckle, the isolation pillar is sleeved inside the via hole, and the spindle screw or bolt is fastened to the lamp body via the isolation pad and the isolation pillar.

4. The easily-assembled/disassembled lighting fixture according to claim 1, wherein a fastening handle is further disposed on the optical lens, the fastening handle is configured to adjust the first buckling slot to be buckled and connected to the second buckle assembly, and a perspective window corresponding to the buckling slot is disposed in the optical lens.

5. The easily-assembled/disassembled lighting fixture according to claim 2, wherein a quantity of the plurality of second buckle assemblies is set to be at least two, each of the second buckle assemblies comprises a fastening block, a buckling block, and a pressing handle, the fastening block is fastened to the bottom of the lamp body, the buckling block is disposed at one end of the fastening block, the pressing handle is disposed at one end of the buckling block, a limiting block is further disposed on each buckling block, and a deformation guide slot is disposed between the pressing handle and the fastening block.

6. The easily-assembled/disassembled lighting fixture according to claim 1, wherein the power supply module further comprises an anti-falling member, and the anti-falling member runs through one side of the bump and abuts against the lifting ring.

7. The easily-assembled/disassembled lighting fixture according to claim 1, wherein the female power connector comprises a positioning pin and a foolproof bump, a positioning hole corresponding to the positioning pin is disposed in the male power connector, a foolproof hole corresponding to the foolproof bump is disposed in the male power connector, an extended interface is further disposed in the male power connector, and a waterproof plug is disposed at the extended interface.

8. The easily-assembled/disassembled lighting fixture according to claim 7, wherein the power supply module can alternatively be fastened to the lamp body by using a screw, the extended interface runs through the optical lens, and the waterproof plug is disposed on the optical lens and is connected to the extended interface in a threaded manner.

9. The easily-assembled/disassembled lighting fixture according to claim 1, wherein a heat sink structure is further disposed on a periphery of the lamp body.

* * * * *